United States Patent
Edrey et al.

(10) Patent No.: US 9,772,933 B1
(45) Date of Patent: *Sep. 26, 2017

(54) SOFTWARE SOLUTION FRAMEWORK SYSTEM, METHOD, AND COMPUTER PROGRAM FOR ALLOWING INTERACTION WITH BUSINESS AND TECHNICAL ASPECTS OF A SOFTWARE APPLICATION AND FOR ALLOWING TESTING OF THE SOFTWARE APPLICATION

(71) Applicant: Amdocs Software Systems Limited, Dublin 3 (IE)

(72) Inventors: Ofir Edrey, Hod Hasharon (IL); Zeev Berkowitz, Netanya (IL); Ofir Betzer, St. Elkana (IL); Talmon Ben-Cnaan, Tzur-Yitzhak (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 325 days.

This patent is subject to a terminal disclaimer.

(21) Appl. No.: 14/507,698

(22) Filed: Oct. 6, 2014

Related U.S. Application Data

(63) Continuation-in-part of application No. 13/722,997, filed on Dec. 20, 2012, now Pat. No. 9,588,634.

(51) Int. Cl.
*G06F 9/44* (2006.01)
*G06F 11/36* (2006.01)
*G06Q 30/02* (2012.01)

(52) U.S. Cl.
CPC ......... *G06F 11/3692* (2013.01); *G06Q 30/02* (2013.01); *G06F 11/3664* (2013.01)

(58) Field of Classification Search
CPC ... G06C 30/02; G06F 3/0481; G06F 11/3664; G06F 11/3684; G06F 11/3692; G06Q 30/02
See application file for complete search history.

(56) References Cited

U.S. PATENT DOCUMENTS

| | | | |
|---|---|---|---|
| 6,353,767 B1* | 3/2002 | Wakeman | G06Q 30/02 700/91 |
| 6,519,571 B1* | 2/2003 | Guheen | G06Q 30/02 705/14.66 |

(Continued)

OTHER PUBLICATIONS

Joseph L. Greathouse et al., "A Case for Unlimited Watchpoints", [Online], 2012, pp. 1-19, [Retrieved from Internet on May 21, 2017], <https://pdfs.semanticscholar.org/a64d/61d30e2221fc2189f2e486b6aa124c40ec95.pdf>.*

(Continued)

*Primary Examiner* — Ziaul A Chowdhury
(74) *Attorney, Agent, or Firm* — Zilka-Kotab, PC

(57) ABSTRACT

A software solution framework system, method, and computer program product are provided for allowing interaction with business and technical aspects of a software application, as well as for allowing testing associated with the software application. In use, an interface is provided to a software solution framework accessible to a plurality of users for interacting with information relating to a plurality of different business and technical aspects of a software application. Additionally, input is received from at least one of the users relating to at least one of the business and technical aspects of the software application, utilizing the interface to the software solution framework, the input including at least one requirement for the software application. Further, the at least one requirement is mapped to at least one system capability associated with the at least one of the business and technical aspects of the software application. In addition, one or more test cases are mapped to the at least one system capability such that each test case, when executed, validates whether tested functionality meets the at least one requirement. Moreover, output is provided relating to the at least one of the business and technical aspects of the (Continued)

software application, utilizing the interface to the software solution framework.

3 Claims, 11 Drawing Sheets

(56) References Cited

U.S. PATENT DOCUMENTS

| | | | | |
|---|---|---|---|---|
| 6,601,192 | B1* | 7/2003 | Bowman-Amuah | G06F 11/3688 714/38.12 |
| 8,121,874 | B1* | 2/2012 | Guheen | G06Q 10/063 705/28 |
| 8,447,641 | B1* | 5/2013 | Kaza | G06Q 10/00 705/7.14 |
| 8,612,406 | B1* | 12/2013 | Said | G06F 17/30171 707/704 |
| 8,763,006 | B2* | 6/2014 | Bobak | G06F 8/30 705/7.26 |
| 2006/0085255 | A1* | 4/2006 | Hastings | G06Q 30/02 705/14.4 |
| 2006/0248504 | A1* | 11/2006 | Hughes | G06F 11/3664 717/101 |
| 2008/0147460 | A1* | 6/2008 | Ollivier | G06Q 10/00 705/7.25 |
| 2008/0244518 | A1* | 10/2008 | Kozempel | G06F 8/36 717/120 |
| 2008/0270159 | A1* | 10/2008 | Constable | G06Q 30/02 705/26.1 |
| 2010/0031247 | A1* | 2/2010 | Arnold | G06F 8/61 717/174 |
| 2010/0057677 | A1* | 3/2010 | Rapp | G06F 9/4446 707/E17.014 |
| 2010/0131928 | A1* | 5/2010 | Parthasarathy | G06F 11/3664 717/126 |
| 2010/0313183 | A1* | 12/2010 | Ellen | G06Q 30/02 717/110 |
| 2011/0258600 | A1* | 10/2011 | Osenkov | G06F 11/3684 717/124 |
| 2013/0018702 | A1* | 1/2013 | Smith | G06Q 10/06 705/7.36 |
| 2013/0227143 | A1* | 8/2013 | Stevens | G06F 9/46 709/226 |
| 2014/0245070 | A1* | 8/2014 | Rumble | G06F 11/3692 714/38.14 |
| 2014/0325486 | A1* | 10/2014 | Zhang | G06F 11/3692 717/125 |
| 2015/0082280 | A1* | 3/2015 | Betak | G06F 11/3692 717/124 |
| 2016/0055077 | A1* | 2/2016 | Baloch | G06F 11/3684 714/38.1 |

OTHER PUBLICATIONS

Tim Harris et al., "Dynamic Filtering: Multi-Purpose Architecture Support for Language Runtime Systems", [Online], 2010, pp. 1-13, [Retrieved from Internet on May 21, 2017], <https://pdfs.semanticscholar.org/2eaf/c06ecb51018ed2d004a51cdedc410e1c1547.pdf>.*

Milind Kulkarni et al., "Optimistic Parallelism Benefits from Data Partitioning", [Online], 2008, pp. 1-11, [Retrieved from Internet on May 21, 2017], <http://delivery.acm.org/10.1145/1350000/1346311/p233-kulkarni.pdf>.*

James Tuck et al., "SoftSig: Software-Exposed Hardware Signatures for Code Analysis and Optimization", [Online], 2008, pp. 145-156, [Retrieved from Internet on May 21, 2017], <http://www.cs.cmu.edu/~chensm/LBA_reading_group/papers/SoftSig-asplos08.pdf>.*

* cited by examiner

US 9,772,933 B1

SOFTWARE SOLUTION FRAMEWORK SYSTEM, METHOD, AND COMPUTER PROGRAM FOR ALLOWING INTERACTION WITH BUSINESS AND TECHNICAL ASPECTS OF A SOFTWARE APPLICATION AND FOR ALLOWING TESTING OF THE SOFTWARE APPLICATION

CLAIM OF PRIORITY

This application is a continuation in part of U.S. application Ser. No. 13/722,997, filed Dec. 20, 2012, the entire contents of which are incorporated herein by reference.

FIELD OF THE INVENTION

The present invention relates to software solutions, and more particularly frameworks providing information relating to software solutions.

BACKGROUND

Typically, frameworks have been used to provide information relating to software solutions, whether already developed or during development. Accordingly, these frameworks are typically for use by a single audience, such as a manual to a developed software solution for use by an end user when interacting with a developed software solution, or a design specification of an undeveloped software solution for use by a software developer in developing such software solution. Accordingly, the aspects of a software solution covered by these frameworks have generally been limited in scope.

There is thus a need for addressing these and/or other issues associated with the prior art.

SUMMARY

A software solution framework system, method, and computer program product are provided for allowing interaction with business and technical aspects of a software application, as well as for allowing testing associated with the software application. In use, an interface is provided to a software solution framework accessible to a plurality of users for interacting with information relating to a plurality of different business and technical aspects of a software application. Additionally, input is received from at least one of the users relating to at least one of the business and technical aspects of the software application, utilizing the interface to the software solution framework, the input including at least one requirement for the software application. Further, the at least one requirement is mapped to at least one system capability associated with the at least one of the business and technical aspects of the software application. In addition, one or more test cases are mapped to the at least one system capability such that each test case, when executed, validates whether tested functionality meets the at least one requirement. Moreover, output is provided relating to the at least one of the business and technical aspects of the software application, utilizing the interface to the software solution framework.

DETAILED DESCRIPTION

Figure 1:
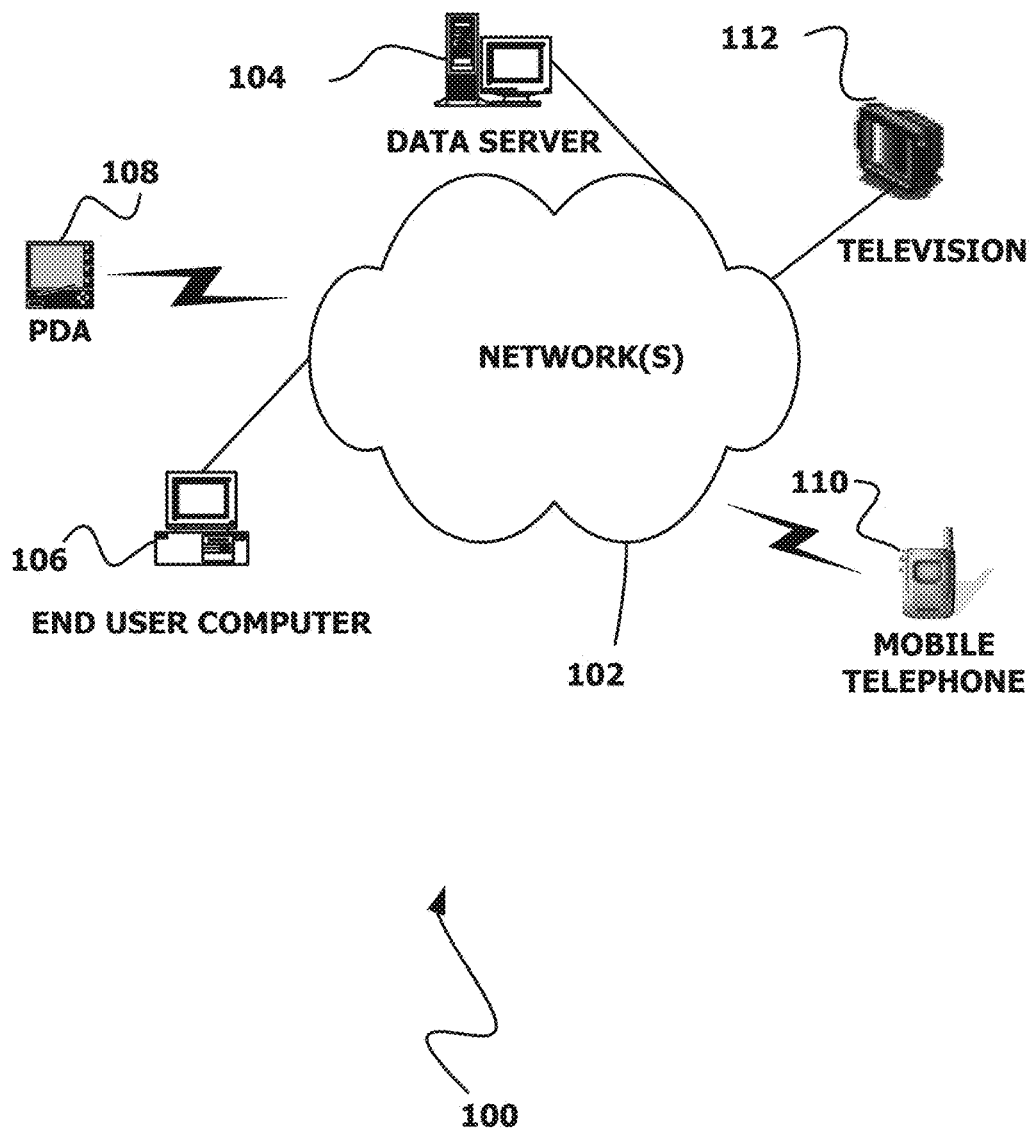
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
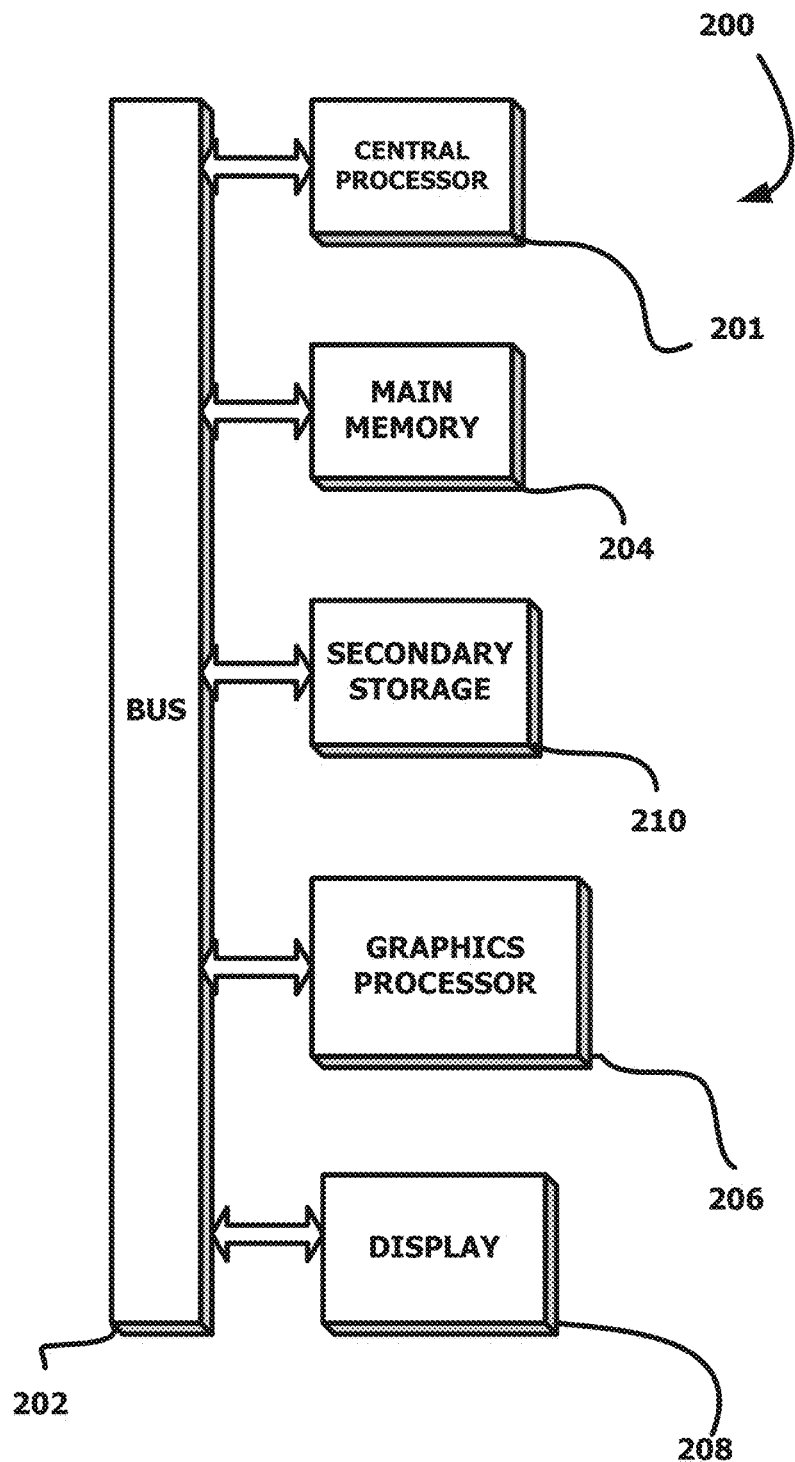
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
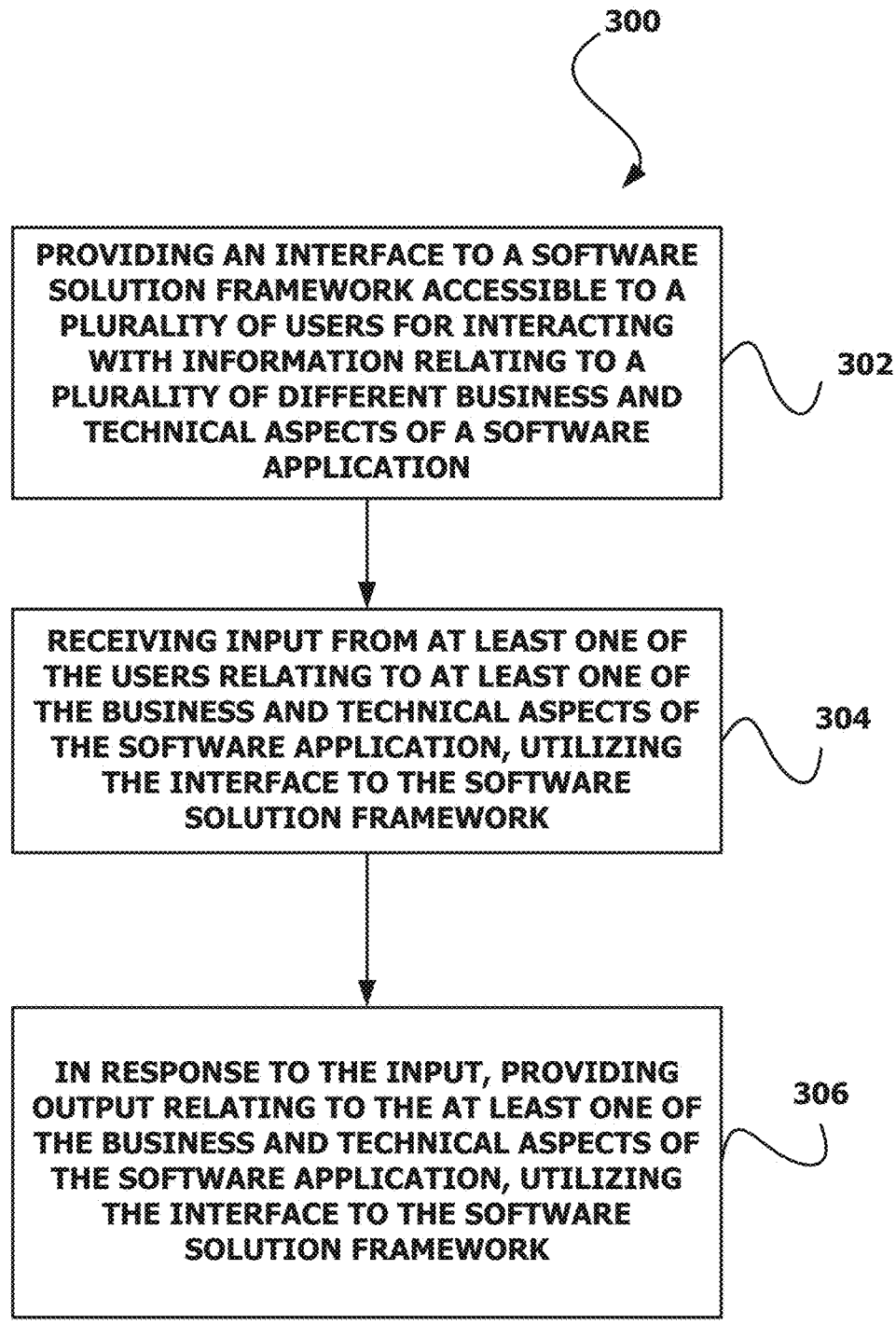
FIG. 3 illustrates a software solution framework method for allowing interaction with business and technical aspects of a software application, in accordance with another embodiment.

FIG. 3 shows a software solution framework method 300 for allowing interaction with business and technical aspects of a software application, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an interface to a software solution framework is provided, such that the interface to the software solution framework is accessible to a plurality of users for interacting with information relating to different business and technical aspects of a software application. In the context of the present description, the interface may be code providing any level of interface to the software solution framework that is accessible to users as noted above. For example, the interface may be one or more user interfaces, such as a graphical user interfaces (GUIs) including a plurality manipulatable elements, such as buttons, radio buttons, check boxes, toggles, text fields, etc.

In addition, the software solution framework may be any application (e.g. package of code, etc.) separate from the software application that is capable of having information relating to business and/or technical aspects of the software application. Thus, the software solution framework may be re-used in different implementations, such as for different projects relating to different software applications. For example, the software solution framework may be used in different implementations for defining, describing, etc. different software applications. In the context of the present embodiment, the software solution framework is described with reference to a single implementation specific to a single software application, but of course as mentioned above the software solution framework may be implemented any number of different times for different software applications.

In one embodiment, the software solution framework may include a collection of libraries relating to the business and technical aspects of the software application. The libraries may be for use in designing the software application and may include documentation. To this end, the libraries of the software solution framework may include functional and application documentation, business process documentation, business benefits and key performance indicators, customer requirements, and project effort documentation. Utilizing these libraries, different users may be able to analyze the software application utilizing various methods by dynamically focusing on particular views and information they seek. Such views may include a benefit view, an application view, a process view, a requirement view, a key process indicator view, a business processes view, and a cost view. The interface may include of these views, or any other views relating to the business and technical aspects of the software application.

In addition, multiple business process steps or sub-processes may be linked together to form a larger, more capable business process. In one embodiment, a business process may be typical of industry business scenarios. In another embodiment, the business process may be an end-to-end business process. In yet another embodiment, the business process may be a detailed business process.

As noted above, the software solution framework allows users to interact with information relating to business aspects of the software application. The business aspects may include best practices of how to best utilize business processes of the software application.

Just by way of example, in the context of the business process documentation, view, etc., the associated business process may include any process performed in the operation of business, such as routine or automatable operations. Optionally, a business process may include processes involved in provisioning services, setup and configuration of networking technologies, and implementation of a service component. Further, a business process may include processes such as data processing, data storage, and data retrieval. Still further, a business process may include processes of order entry, order completion, order fulfillment, product management, portfolio management, product lifecycle management, and product upgrades. By way of a specific example, an "order completion" business process may describe a finalization of a customer order process, including sending notification to all downstream systems, including billing and customer relationship management (CRM) systems, so that a customer-installed product base may be updated and a service can be used.

Further, the best practices may include industry best practices, such as best practice processes for maximizing capabilities of the software application, and best practice key process indicators. Also, the business aspects may include key process indicators and benefits that may be realized by the software application.

Still further, the software solution framework allows users to interact with information relating to technical aspects of the software application. The technical aspects may include customer requirements such as business requirements, and/or architectural requirements. In one embodiment, the customer requirements may include processing capabilities, execution options, and runtime abilities. For example, the customer requirements may include the ability to analyze offers, apply rules, such as product compatibility rules, generate summaries, and support an interaction workflow.

In one embodiment, the software solution framework may include a system capability library. The system capability library may include various building blocks, where the building blocks provide relationships between the business and technical aspects of the software application. The various building blocks may be used in scoping and design documents that present the software application, further enabling traceability to business processes, requirements, and pricing estimations. The scoping and design documents may be generated as output by the software solution framework. In addition, the system capability library may be an integrative documentation layer, and may serve as a common language between various tools of a sales process, enabling navigation between such sales process tools. By way of example, "set credit limit" may be a system capability that supports multiple aspects of the software application. As an option, the "set credit limit" system capability may be integrated into the software application using the software solution framework to support business processes invoked when an end-user of the customer orders a product. As another option, the "set credit limit" system capability may be integrated into the software application using the software solution framework to set monthly caps on account balances, preventing bill shock that otherwise might affect the end-user.

To this end, the software solution framework may serve as a coherent repository of best practices for building relationships between different business and technical aspects of the software application. Because the best practices may be pre-existing within the software solution framework, the software solution framework may ensure rapid development of the software application due to already known relationships between the different business and technical aspects of the software application. Further, keeping a repository of best practices may ensure that relationships developed during the development of the software application may be packaged and leveraged during the subsequent development of other software applications.

Still yet, in another embodiment, the plurality of users may include not only a multiplicity of different users, but may also include different types of users. For example, some of the users of the software solution framework may include businesspersons, such as salespeople. Such businesspersons may use the software solution framework for presenting the software application for sale. Further, the businesspersons may use the documentation included in the software solution framework during such sales presentations, or for reference as needed. To this end, the software solution framework may provide sales aids and sales oriented tools that link between business and technical aspects of the software application. For example, the software solution framework may allow the management and mapping of the business and technical aspects of the software application.

Still further, some of the users of the software solution framework may include developers. Such developers may utilize the software solution framework during development of the software application. For example, the developers may use output from the software solution framework relating to the technical aspects of the software application when developing the software application for, and delivering the software application to, a customer.

Still further, some of the users of the software solution framework may include customers. By way of using the software solution framework, the customers can assist in defining the software application being developed and which they have purchased, or which they may ultimately purchase.

Still further, in on embodiment, some of the users of the software solution framework may include testers. By way of using the software solution framework, the testers can learn how requirements were planned to be met and design how to test it.

In one embodiment, the interface may include different views defined for the different types of users. For example, there may be a salesperson specific view for salespersons using the software solution framework. Further, there may be a developer specific view for developers using the software solution framework. Still further, there may be a customer specific view for customers using the software solution framework. Any of these different views may be operable to receive input from the users, or provide output to the users, of the software solution framework. Also, any of the views previously noted above may be part of one or more of the user specific views.

To this end, the software solution framework may improve collaboration between salespersons, developers, and customers during a project lifecycle of the software application, such as during the sales and design of the software application. In this respect, the software solution framework may serve to run sessions, collect feedback, provide guidance for approaching stakeholders or prospective customers, assist in optimizing a solution analysis, reduce customization of the software application by providing baseline best practices, and accelerate review and sign-off of the software application. By way of a more specific example, the software solution framework may be used during scoping sessions to illustrate aspects of the software application available to customers, providing a relevant solution context to each aspect of the software application. Further, feedback received within the software solution framework during the scoping sessions may facilitate traceability, and increase clarity of any changes requested by a user.

In one embodiment, the information relating to the different business and technical aspects of the software application may include sales information. For example, a business aspect of the software application may include sales information illustrating benefits conferred from use of the software application. By way of a specific example, the software solution framework may be utilized by a salesperson, in the presence of a customer, to interact with the sales information and demonstrate the value of the software application as a solution to the customer. To this end, the software solution framework may be utilized to ensure traceability between phases of sales, design, development, and implementation of the software application. Further, the software solution framework may provide better control over a scope of the software application.

Additionally, as shown in operation 304, input is received from at least one of the users relating to the business and technical aspects of the software application, utilizing the interface of the software solution framework. As noted previously, different users may use the software solution framework to analyze the software application utilizing various methods by dynamically focusing on the particular views and information they seek. Such views may include a benefit view, an application view, a process view, a requirement view, a key process indicator view, a business processes view, and a cost view. The interface may therefore include any of these views, or any other views relating to the business and technical aspects of the software application. To this end, the software solution framework offers a unified shared workspace for all individuals involved in the sales, design, and implementation of the software application.

It should be noted that the input received from the user may be any command, data, etc. relating to a business and/or technical aspect of the software application that is capable of being received from the user via the interface to the software solution framework. For example, the input may be a request for one of the aforementioned views. As another example, the input may be data defining one of the business and/or technical aspects of the software application.

In one embodiment, the received input may be feedback from the user, where the user is a salesperson, a customer, or a developer, or any other user of the software solution framework. The feedback received from the user may be feedback for another user of the software solution framework, such as another salesperson, customer, or developer. The other user of the software solution framework may receive such feedback, and implement the contents of the feedback in the software application. For example, the other user of the software solution framework may customize an aspect of the software application based on the feedback received from the user. Still further, the feedback received from the user may be in reference to any business or technical aspect of the software solution framework.

In another embodiment, the received input may include a selection of a business process relating to a business aspect of the software application. In still another embodiment, the received input may include an entry of information relating to a business and/or technical aspect of the software application. In yet another embodiment, the received input may include the selection of a GUI element relating to a business and/or technical aspect of the software application.

Still further, the input received within the software solution framework may be any combination of any of the above received inputs. By way of example, the received input may request the identification of revenue engines of a customer. As another example, the received input may request an identification of systems necessary to realize one or more selected processes for the customer. As yet another example, the received input may be a selection of one or more particular business scenarios, such as when a customer orders a product or when a customer activates a product.

More specifically, such order and activation scenarios may include an end-user ordering a pre- or post-paid mobile product via a call center, an end-user ordering a pre- or post-paid mobile product via a cellular service provider storefront, or an end-user ordering a postpaid mobile product via self-service. Similarly, such scenarios may include an end-user activating a pre- or post-paid mobile product via a call center, an end-user activating a pre- or post-paid mobile product via a cellular service provider storefront, or an end-user activating a postpaid mobile product via self-service.

Further, as shown in operation 306, output relating to the at least one of the business and technical aspects of the software application is provided in response to the input, utilizing the interface. As an option, the output may be provided to the user from which the input was received. As another option, the output may be provided to another one of the users.

In one embodiment, the output may include a high-level design document relating to the business and technical aspects of the software application. The high-level document relating to the business and technical aspects of the software application and may describe a process associated with the input received in operation 304. For example, the high level design document may be input for the technical users/reviewers and the developers.

For example, the high-level design document may present a business process for enabling an end-user to order a product, such as one of the pre- or post-paid mobile products, noted above. More specifically, the business process for enabling the end-user to order the product, as found in the high-level design document, may include steps for creating entities in a system. Such steps may include capturing an end-user identification number; performing a credit check on the end-user; assessing a risk associated with the end-user based on a credit score result of the credit check; determining a credit limit associated with the end-user based on the credit risk or credit score; determining eligible pay channels for the end-user based on the credit limit, the credit risk, or the credit score; and determining whether a deposit is required from the end-user based on any of the above.

To this end, the high-level design document may be used by a user, such as a developer, for building or implementing the software application. For example, the high-level design document may indicate necessary modules for implementing the software application, based on requirements or needs specified by a customer. The software application may then be developed by the developer to include the indicated necessary modules, based on the output of the software solution framework.

In another embodiment, the output may include a mapping relating to the business and technical aspects of the software application. The mapping may include a mapping of customer requirements to system capabilities. For example, the mapping may include a first requirement that is mapped to first system capabilities for fulfilling the first requirement. Further, the mapping may include multiple requirements mapped to a single system capability.

In yet another embodiment, the output may include a high-level solution relating to the business and technical aspects of the software application. The high-level solution may be used by business users/reviewers, such as a salesperson or customer, for reviewing the business and technical aspects of the software application. For example, the high-level solution may indicate necessary modules for implementing the software application, based on requirements or needs specified by the customer. The salesperson or customer may then review the high-level solution for various reasons, such as for ensuring completeness of the software application, or for ensuring that the software application falls within a predefined budget. Also, the output may include a business process relating to the business and technical aspects of the software application. Still yet, the software solution framework may further provide tools and methodologies for ensuring collaboration between customers, salespersons, and developers, ultimately reducing project effort and duration, and increasing value of the software application to the customers.

The software solution framework may serve as a tool for linking between various dimensions of the software application, allowing the presentation of both business and technical aspects to a user, such as a customer, a salesperson, or a developer. For example, during an initial interest presentation to the customer's management, high level business aspects of the software application may be presented using the software solution framework. As another example, the software solution framework may further be used during more detailed presentations to business and technical teams of the customer, where such presentations drill down into technical aspects of the software application. The presentations may provide information relating to a plurality of different business and technical aspects of the software application.

As still yet another example, the software solution framework may be used to receive input from the customer relating to business and technical aspects of the software application, and then provide output, such as a design of the software application, and a price of the software application. Shared use of the software solution framework by both the salesperson and the customer may ensure that the software application stays within its originally intended scope, and that the price of the software application stays within a previously established budget. Still further, the software solution framework may allow users to interact with the information relating to the business and technical aspects of the software application for designing, analyzing, etc. the software application, ensuring completeness of the software application. The software solution framework may also provide clarity to users of the software solution framework by allowing the users to visualize relationships between the business and technical aspects of the software application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
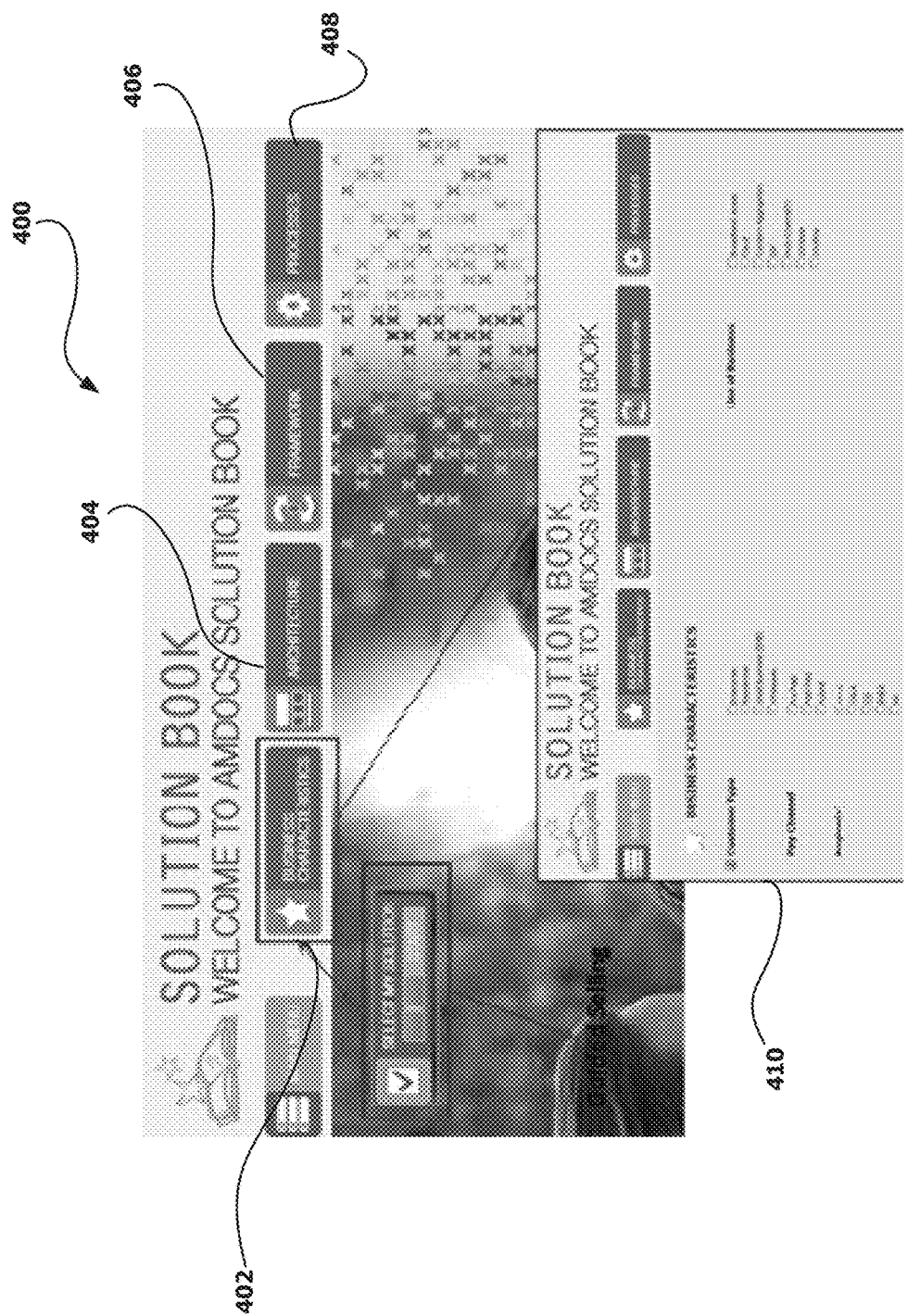
FIG. 4 illustrates an interface of a software solution framework for allowing interaction with business and technical aspects of a software application, in accordance with still yet another embodiment.

FIG. 4 shows an interface 400 of a software solution framework for allowing interaction with business and technical aspects of a software application, in accordance with one embodiment. As an option, the interface 400 may be implemented in the context of the details of FIGS. 1-3. Of course, however, the interface 400 may be implemented in any desired environment. Further, the aforementioned definitions may equally apply to the description below.

As shown in FIG. 4, the interface 400 includes a variety of buttons available for selection to users of the software solution framework. In one embodiment, the interface 400 may be a "Main Menu" interface of the software solution framework. The "Main Menu" interface of the software solution framework may be provided upon initializing runtime of the software solution framework.

As also shown in FIG. 4, the interface 400 includes multiple buttons 402-408. The buttons 402-408 of the interface 400 may include a "Business Characteristics" button 402, an "Architecture" button 404, a "Framework" button 406, and a "Processes" button 408. A user selection of one of the buttons 402-408 may result in a presentation of a corresponding sub-interface. For example, a selection of the "Business Characteristics" button 402 may result in a presentation of "Business Characteristics" sub-interface 410.

In an embodiment, the "Business Characteristics" sub-interface 410 is operable to receive input from a user. For example, the "Business Characteristics" sub-interface 410 is operable to receive from the user a selection business characteristics associated with a software application. The business characteristics available for selection by the user may include a customer type, a pay channel, a region, and a line of business. For example, the user of the "Business Characteristics" sub-interface 410 may be a customer that is providing input by selecting business aspects representative of the user's business, and the selected business aspects may be subsequently used for designing and building the software application.

Further, each of the "Architecture" button 404, the "Framework" button 406, and the "Processes" button 408 may provide additional functionality for users of the software solution framework. By way of example, the "Architecture" button 404 may be selected by a user for viewing of an "Architecture" interface. The "Architecture" interface may be operable to receive input from a user. For example, the "Architecture" interface may be operable to receive from the user a selection of architecture options associated with the software application. The architecture options may be business and technical aspects of the software application. Further, the "Architecture" interface may be operable to provide output relating to the business and technical aspects of the software application. The output provided by the "Architecture" interface of the software solution framework may be based on business aspects previously defined using the "Business Characteristics" sub-interface 410. The user of the "Architecture" interface may be a customer, a salesperson, or a developer.

Further, the "Framework" button 406 may be selected by a user for viewing of a "Framework" interface. The "Framework" interface may be operable to receive input from a user. For example, the "Framework" interface may be operable to receive from the user a selection of framework options associated with the software application. The framework options may include business aspects of the software application, for example for filtering or focusing the software application based on industry business process standards. The framework options may also include business aspects of the software application for filtering or focusing the software application based on any other baseline business process framework, or standardized business process framework. Further, the "Framework" interface may be operable to provide output relating to the business and technical aspects of the software application. The output provided by the "Framework" interface of the software solution framework may be based on business characteristics previously defined using the "Business Characteristics" sub-interface 410 or architecture options selected in the previously noted "Architecture" interface. The user of the "Architecture" interface may be a customer, a salesperson, or a developer.

Still further, the "Processes" button 408 may be selected by a user for viewing of a "Processes" interface. The "Processes" interface may be operable to receive input from a user. For example, the "Processes" interface may be operable to receive from the user a selection of process options associated with the software application. Further, the "Processes" interface may be operable to provide output relating to the business and technical aspects of the software application. The output provided by the "Processes" interface of the software solution framework may be based on business characteristics previously defined using the "Business Characteristics" sub-interface 410, architecture options selected in the previously noted "Architecture" interface, or framework options selected in the previously noted "Framework" interface. The user of the "Processes" interface may be a customer, a salesperson, or a developer.

Figure 5:
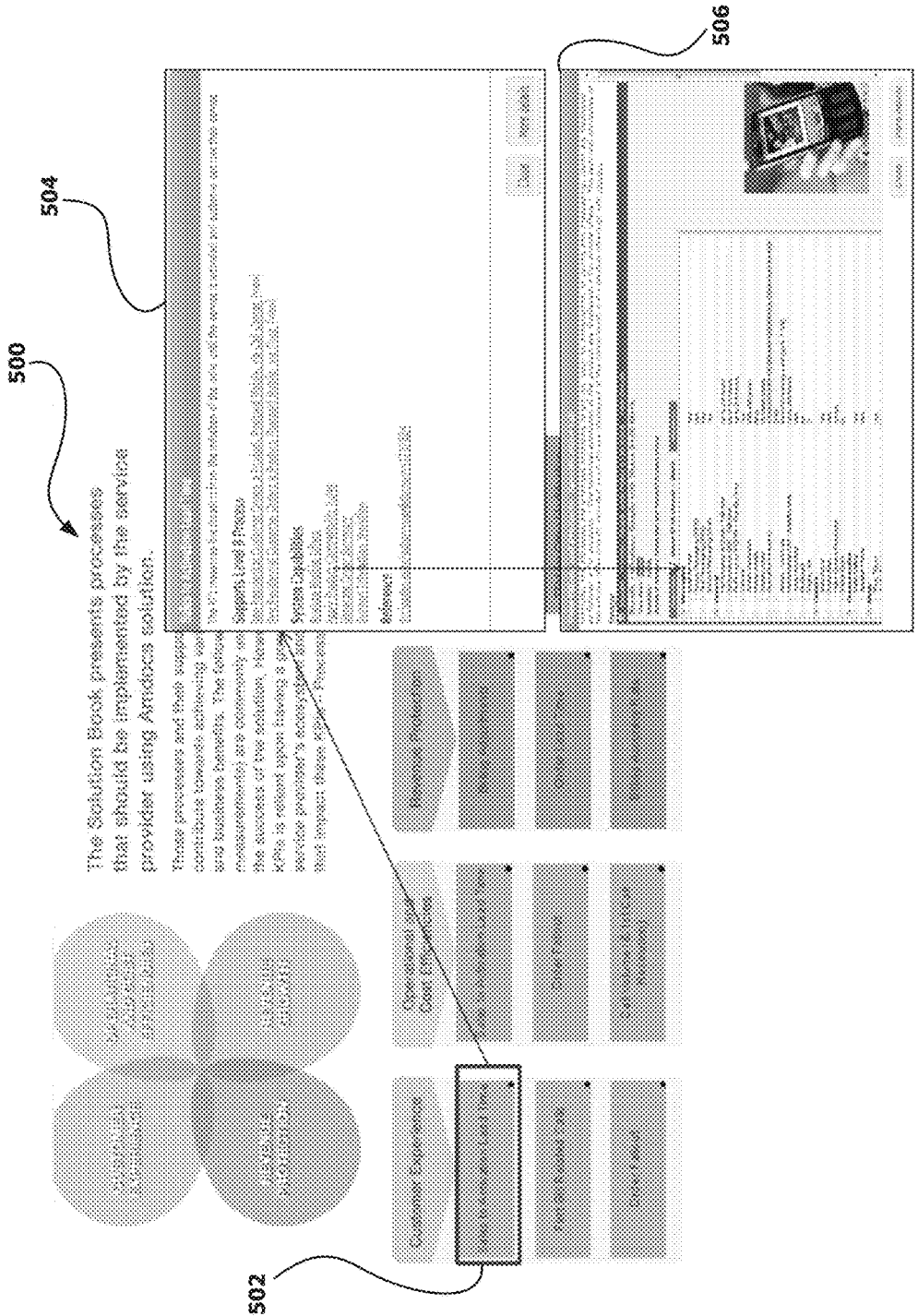
FIG. 5 illustrates an interface for linking customer targets into a software application, in accordance with yet another embodiment.

FIG. 5 shows an interface 500 for linking customer targets into a software application, in accordance with one embodiment. As an option, the interface 500 may be implemented in the context of the details of FIGS. 1-3. Of course, however, the interface 500 may be implemented in any desired environment. Further, the aforementioned definitions may equally apply to the description below.

In one embodiment, interface 500 may be provided to a user for interaction with information relating to a plurality of different business and technical aspects of the software application. The interface 500 may be operable to receive input from a user relating to business and technical aspects of a software application. In another embodiment, the interface 500 may be operable to provide output relating to the business and technical aspects of the software application.

Input received using the interface 500 may include a selection of a button by the user. The user may be a customer, a salesperson, or a developer. Further, the interface 500 may include multiple buttons for selection, and some of the buttons may be operable to link customer targets into the software application. These buttons may be categorized into categories such as "Customer Experience," "Operational and Cost Efficiencies," "Revenue Protection," and "Revenue Growth."

In addition, the "Customer Experience" category may include buttons that are operable to open additional sub-interfaces upon selection. The additional sub-interfaces may be operable to receive further input from the user, or to provide further output, relating to the business and technical aspects of the software application. The buttons within the "Customer Experience" category may include a "Sales to Activation Lead Time" button 502, a "First Bill Related Costs" button, an "Order Fallout" button, and an "Average Handling Time" button.

In response to receiving a selection of the "Sales to Activation Lead Time" button 502, a sub-interface 504 may open for receiving user input pertaining to sales and activation lead times. Sales and activation lead times may relate to the business and technical aspects of the software application. Further, in response to receiving a selection from a user of an option within the sub-interface 504, a second sub-interface 506 may open for receiving additional user input pertaining to the sales and activation lead times. Such additional user input may include input for linking customer targets into the software application. Input linking customer targets into the software application may relate to the business and technical aspects of the software application.

Also, the "Operational and Cost Efficiencies" category may include buttons that are operable to open additional sub-interfaces upon selection. The additional sub-interfaces may be operable to receive further input from the user, or to provide further output, relating to the business and technical aspects of the software application. The buttons within the "Operational and Cost Efficiencies" category may include a "Sales to Activation Lead Time" button, an "Order Fallout" button, a "Call Volume (& 1st Call Resolution)" button, and an "Order Lead Time" button.

Similarly, the "Revenue Protection" category may include buttons that are operable to open additional sub-interfaces upon selection. The additional sub-interfaces may be operable to receive further input from the user, or to provide further output, relating to the business and technical aspects of the software application. The buttons within the "Revenue Protection" category may include a "Billing Adjustments" button, an "Order Lead Time" button, and a "Billing Accuracy Rate" button.

In addition, the "Revenue Growth" category may include buttons that are operable to open additional sub-interfaces upon selection. The additional sub-interfaces may be operable to receive further input from the user, or to provide further output, relating to the business and technical aspects of the software application. The buttons within the "Revenue Growth" category may include a "Time to Market for New Offers/Products" button, and a "Time to Market for Offer Modification" button.

A selection by the user of the "Sales to Activation Lead Time" button 502 may present the sub-interface 504 for allowing the user to select amongst "System Capabilities" and "level B processes." System Capabilities may include "Analyze Eligible Offers," "Apply Product Compatibility Rules," "Generate Order Summary," "Support Interaction Workflows." Further, "level B processes" may include "New Residential Customer Orders a Product, Postpaid Mobile, via Shop," "Customer Has Upgrade Request for Mobile Device and/or Offer via Shop," and "New Residential Customer orders a Product, Postpaid Mobile, via Call Center." Also, offers available for selection may include "Wireless," "High-Speed Internet," "VoIP," "TV," "Wireless Basic," "Wireless Get Free Minutes," "Wireless Get Free Minutes Plan," "Wireless Get Free Minutes Plan for corporate," "Wireless Get Free SMS," and "Wireless Pre Paid." A selection by the user of any of the preceding "System Capabilities," "level B processes," or offers, may be input relating to the business and technical aspects of the software application.

Figure 6:
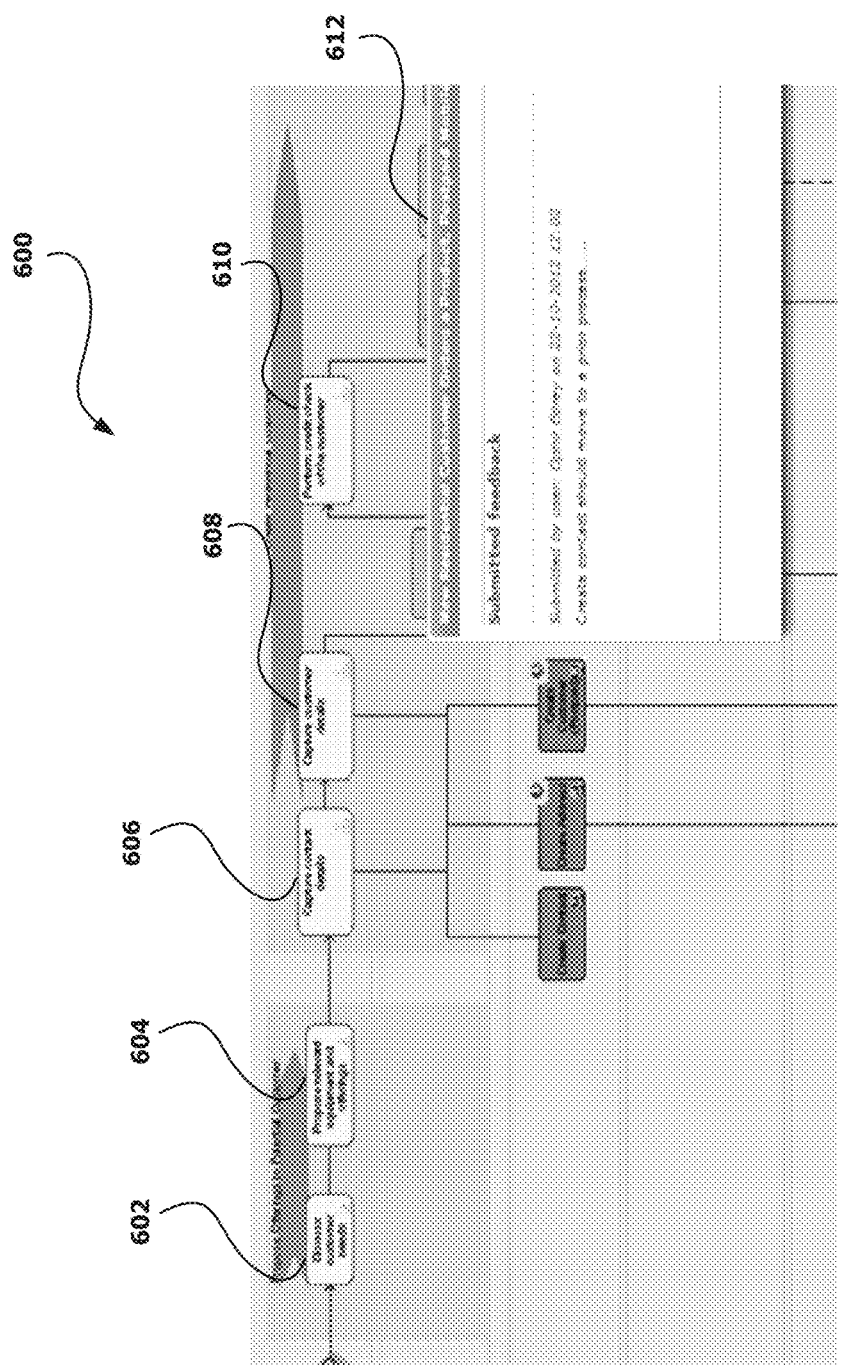
FIG. 6 illustrates an interface for receiving feedback on a business process of a software application, in accordance with still another embodiment.

FIG. 6 shows an interface 600 for receiving feedback on a business process of a software application, in accordance with one embodiment. As an option, the interface 600 may be implemented in the context of the details of FIGS. 1-3. Of course, however, the interface 600 may be implemented in any desired environment. Further, the aforementioned definitions may equally apply to the description below.

In one embodiment, interface 600 may be provided to a user for interaction with information relating to a plurality of different business and technical aspects of the software application. As illustrated in FIG. 6, interface 600 is shown to present a business process containing business process steps 602-610. Further, the interface 600 is shown to present feedback sub-interface 612.

In one embodiment, the business process steps 602-610 may be steps within a software application. The business process steps 602-610 may be associated with creating a new end-user telecommunications customer. For example, business process step 602 includes discussing customer needs, and business process step 604 includes proposing relevant equipment and offerings. Further, business process step 606 includes capturing contact details, business process step 608 includes capturing customer details, and business process step 610 includes performing a credit check of the customer.

Based on the presentation of the business process steps 602-610, input may be received from a user relating to business and technical aspects of the software application. For example, feedback may be received from the user pertaining to the business process steps 602-610 by way of the feedback sub-interface 612. The user may be a salesperson, a customer, or a developer, or any other user of a software solution framework. By way of further example, the feedback received in the feedback sub-interface 612 may be in regard to a connectivity of the business process steps 602-610, such as missing business process steps, or redundant business process steps. Still further, the feedback received in the feedback sub-interface 612 may be in regard to any other business and technical aspect of the software application. The feedback received in the feedback sub-interface 612 may include feedback received from a salesperson, and may be feedback associated with the software application.

In one embodiment, the sub-interface 612 may indicate a submitting user, and a submitting date and time, for the received feedback. In another embodiment, the interface 600 of the software solution framework may be used by a user for focusing on a particular business process, such as the business process containing the business process steps 602-610.

Figure 7:
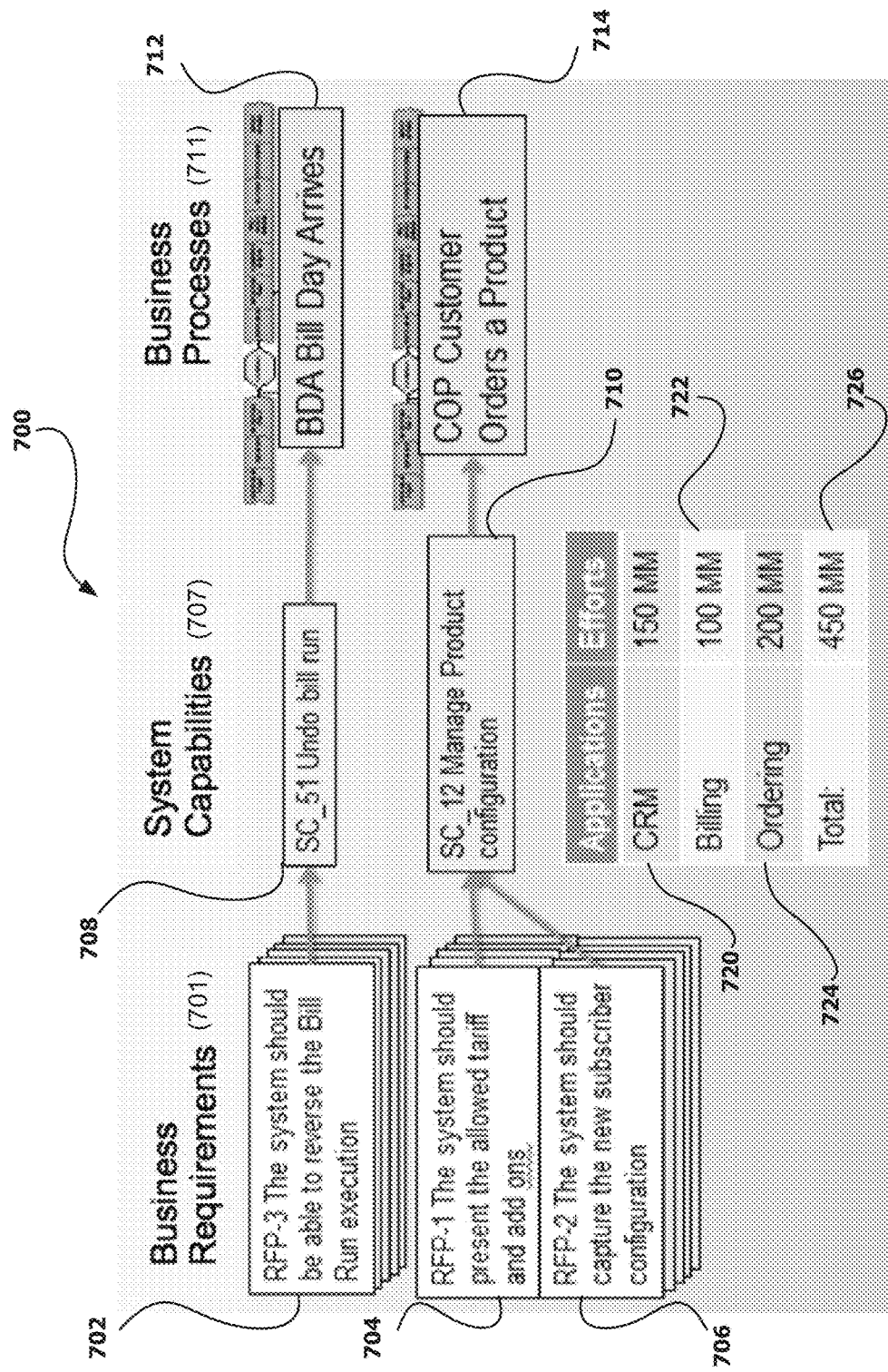
FIG. 7 illustrates a mapping of customer requirements and system capabilities of a software application, in accordance with another embodiment.

FIG. 7 shows a mapping 700 of customer requirements and system capabilities of a software application, in accordance with one embodiment. As an option, the mapping 700 may be implemented in the context of the details of FIGS. 1-3. For example, the mapping 700 may be displayed in a GUI as the output in the context of operation 306 of FIG. 3. Of course, however, the mapping 700 may be implemented in any desired environment. Further, the aforementioned definitions may equally apply to the description below.

As illustrated by FIG. 7, the mapping 700 is shown to include business requirements 701, system capabilities 707, and business processes 711. As noted above, the business requirements 701 may be needs or requirements that have previously been established by a customer as being deliverables that are necessary components of a software application. The business requirements 701 may be received from the customer as input relating to business aspects of the software application. With specific reference to FIG. 7, the mapping 700 is shown to include three business requirements established by the customer. A first business requirement 702 includes Request For Production 3 (RFP-3), indicating that the customer wants the software application to be able to reverse a bill run execution. A second business requirement 704 includes RFP-1, indicating that the customer wants the software application to be able to present an allowed tariff and add-ons. A third business requirement 706 includes RFP-2, indicating that the customer wants the software application to be able to capture a new subscriber configuration. The software application is not limited with respect to a number of the business requirements 701 that may be specified by the customer, and accordingly may include more than three business requirements, or requests for production. To this end, the business requirements 701 may include any and all business and technical aspects that the customer indicates are necessary aspects of the software application.

Further, the system capabilities 707 may include building blocks that provide relationships between business and architectural aspects of the software application. For example, the system capabilities 707 may be capabilities of the software application that are capable of, at least in part, serving to meet a corresponding business requirement established by the customer. In one embodiment, the system capabilities 707 may be pre-existing, or pre-built, for accelerating the assembly of the business processes 711.

With specific reference to FIG. 7, the mapping 700 is shown to include two system capabilities. A first system capability 708 includes SC_51, which is used to undo a bill run. The first system capability 708 has been mapped to the first business requirement 702 established by the customer. The first system capability 708 may have been mapped to the first business requirement 702 because the first system capability 708 was identified to meet the customer's needs established by the first business requirement 702. Or, more specifically, the first system capability 708 has been mapped to the first business requirement 702 because the first system capability 708 will undo a bill run, which meets the first business requirement 702 specifying that the software application should be able to reverse the bill run execution.

A second system capability 710 includes SC_12, which is used to manage a product configuration. The second system capability 710 has been mapped to both of the second business requirement 704 and the third business requirement 706 established by the customer. The second system capability 710 may have been mapped to the second business requirement 704 because the second system capability 710 was identified to meet the customer's needs established by the second business requirement 704. Similarly, the second system capability 710 may have been mapped to the third business requirement 706 because the second system capability 710 was identified to meet the customer's needs established by the third business requirement 706. Or, more specifically, the second system capability 710 has been mapped to the second business requirement 704 and the third business requirement 706 because the second system capability 710 manages a product configuration, which meets both the second business requirement 704 specifying that the software application should present the allowed tariff and add-ons, and the third business requirement 706 specifying that the software application should capture the new subscriber configuration.

The software application is not limited with respect to a number of the business requirements 701 that may be mapped to one of the system capabilities 707. Accordingly one of the system capabilities 707 may be mapped to more than one of the business requirements 701. Further, the mapping 700 may include more than two system capabilities. To this end, the system capabilities 707 may include any and all system capabilities which are needed to meet the business and technical aspects that the customer has indicated are necessary aspects of the software application.

With further reference to FIG. 7, the mapping 700 is shown to include two business processes 711. A first business process 712 may be for when bill day arrives, and is shown mapped to the first system capability 708. The first business process 712 may be included in the software application as a result of being mapped to the first system capability 708. A second business process 714 may be for when a customer orders a product, and is shown mapped to the second system capability 710. The second business process 714 may be included in the software application as a result of being mapped to the second system capability 710.

The mapping 700 may be stored by the software solution framework based on input from a user of the software solution framework. Further, the mapping 700 may be provided as output from the software solution framework based on input from a user of the software solution framework. To this end, the mapping 700 may provide clear navigation between the system capabilities 707 and the business processes 711. Further, the mapping 700 may assist in identifying functional gaps present in the software application, such as gaps between the business requirements 701 and the system capabilities 707, or between the system capabilities 707 and the business processes 711. Still further, based on the business processes 711, a user of the software solution framework may be able to provide a pricing or cost estimate to a customer for the software application.

In one embodiment, the business requirements 701 are mapped to the system capabilities 707 during a sales process. This mapping may create an indirect link to key process indicators of business processes, and other software applications. The system capabilities 707 may include pricing elements that encompass a cost estimation of the business and technical aspects of the software application. As a result, the mapping 700 may allow for assessment and estimation of both coverage and cost for the business and technical aspects of the software application.

For example, the first business requirement 702 may be received from the customer during the sales process, and is thereafter mapped to the first system capability 708. Because of this mapping, the first system capability 708 may therefore appear in any of the various interfaces of the software solution framework, such as the interfaces 500 and/or 600 of FIGS. 5-6, for allowing a user of the software solution framework to aggregate costs based on different business and technical aspects of the software application. As specifically shown in FIG. 7, a total aggregation of costs 726 is a sum of CRM applications and efforts 720, billing applications and efforts 722, and order applications and efforts 724. The applications and efforts 720-724 may be included in the software application based on received input relating to the business and technical aspects of the software application, such as the needs or requirements previously established by the customer.

Figure 8:
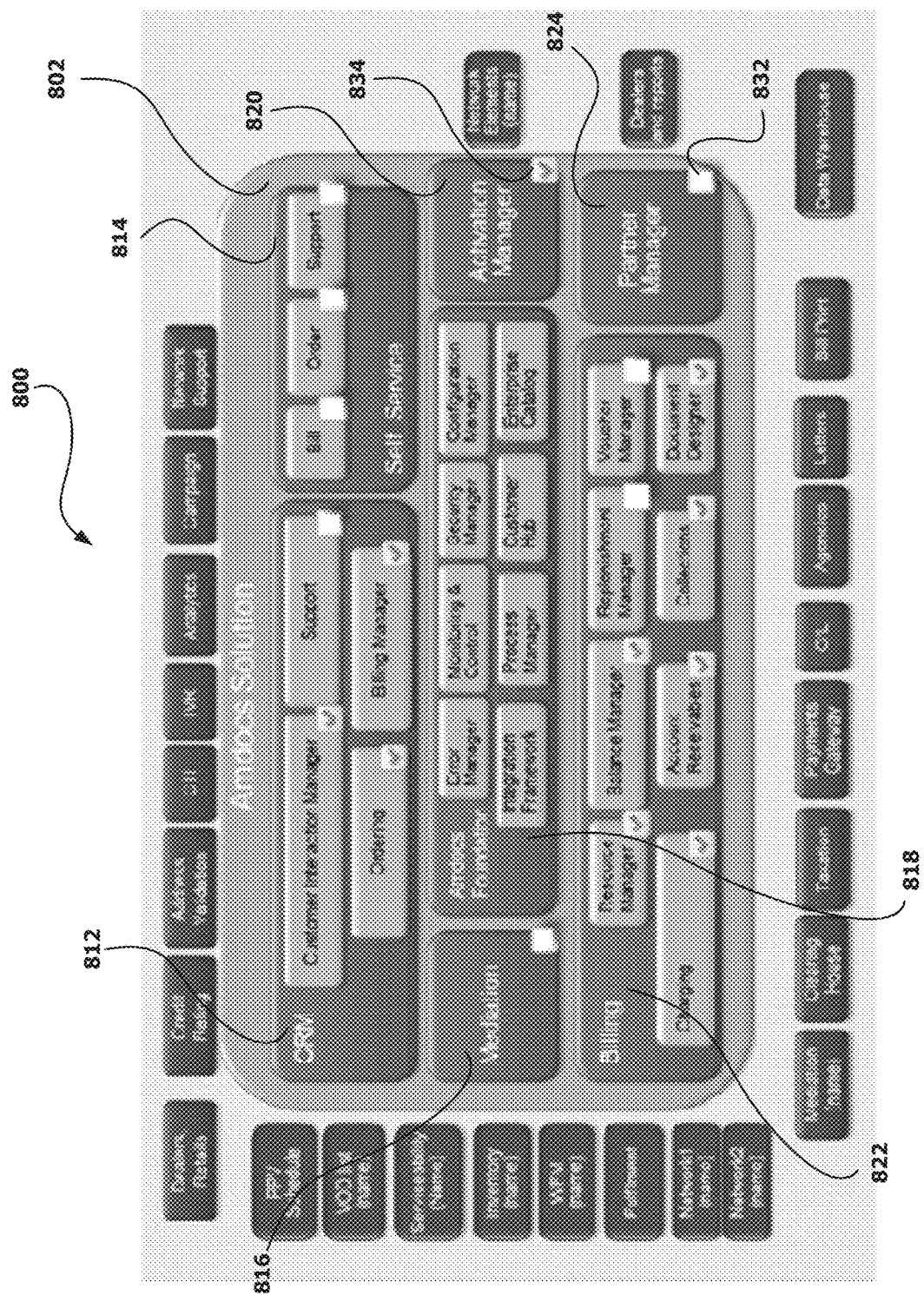
FIG. 8 illustrates an architecture solution for business and technical aspects of a software application, in accordance with still yet another embodiment.

FIG. 8 shows an architecture solution 800 for business and technical aspects of a software application, in accordance with one embodiment. As an option, the architecture solution 800 may be implemented in the context of the details of FIGS. 1-3. For example, the architecture solution 800 may be displayed in a GUI as the output in the context of operation 306 of FIG. 3. Of course, however, the architecture solution 800 may be implemented in any desired environment. Further, the aforementioned definitions may equally apply to the description below.

As shown in FIG. 8, the architecture solution 800 is shown to include a software application 802, which includes a customer relationship management (CRM) module 812, a self service module 814, a mediation module 816, an Amdocs foundation module 818, an activation manager module 820, a billing module 822, and a partner manager module 824. The software application 802 may be a model of a desired software application. Each of the modules 812-824 may be included in the software application as a result of a mapping between customer requirements, system capabilities, and business requirements, as described above in the context of the mapping 700 of FIG. 7.

The architecture solution 800 may be provided as output to a user of the software solution framework, based on input previously provided to the software solution framework. For example, the architecture solution 800 may be provided as output to a developer. Further, the input may have been from another user of the software solution framework, such as a customer or a salesperson.

Further, each of the modules 812-824 may contribute a unique functionality to the software application 802. More specifically, the CRM module 812 provides CRM functionality to the software application 802, the self service module 814 provides self service functionality to the software application 802, the mediation module 816 provides mediation functionality to the software application 802, the Amdocs foundation module 818 provides foundation functionality to the software application 802, the activation manager module 820 provides activation functionality to the software application 802, the billing module 822 provides billing functionality to the software application 802, and the partner manager module 824 provides partner management functionality to the software application 802.

In one embodiment, one or more of the modules 812-824 may include sub-modules. For example, the CRM module 812 may include sub-modules such as a customer interaction manager sub-module, a support sub-module, an ordering sub-module, and a billing manager sub-module. Similarly, the self service module 814 may include a bill sub-module, an order sub-module, and a support sub-module. Also, the foundation module 818 may include an error manager sub-module, a monitoring & control sub-module, a security manager sub-module, a configuration manager sub-module, an integration framework sub-module, a process manager sub-module, a customer hub sub-module, and an enterprise catalog sub-module. In addition, the billing module 822 may include a resource manager sub-module, a balance manager sub-module, a replenishment manager sub-module, a voucher manager sub-module, a charging sub-module, an account receivables sub-module, a collections sub-module, and a document designer sub-module.

In another embodiment any of the modules 812-824 may be associated with a flag. Each of the flags may be an included flag 834, or a not included flag 832. Accordingly, association of a module or sub-module with a not included flag indicates that the associated module or sub-module is not included in the software application. Conversely, the association of a module or sub-module with an included flag indicates that the associated module or sub-module is included in the software application. An included flag may indicate that an associated module or sub-module is a required business or technical aspect of the software application based on a requirement. The requirement may be a business requirement, and may be established by a customer.

By way of specific example, the architecture solution 800 is shown with the not included flag 832 set to the partner manager module 824. Further, the architecture solution 800 is shown with the included flag 834 set to the activation manager module 820. As a result of the not included flag 832 set to the partner manager module 824, the software application 802 may not include the partner management functionality associated with the partner manager module 824. Conversely, as a result of the included flag 834 set to the activation manager module 820, the software application 802 may include the activation functionality associated with the activation manager module 820. The exclusion of the partner management functionality from the software application, and the inclusion of the activation functionality in the software application, may be based on received input relating to the business and technical aspects of the software application, such as, for example, customer requirements or business requirements. To this end, the software application may be a software application customized for the customer based on requirements particular to the customer.

The architecture solution 800 may be stored by the software solution framework based on input from a user of the software solution framework. Further, the architecture solution 800 may be provided as output from the software solution framework based on input from a user of the software solution framework. The architecture solution 800 may help users visualize the magnitude and complexity of business support system and operational support system components of the software application.

In one embodiment, testability and testing documentation may be added to the software solution framework described herein. For example, in addition to the software solution framework described, in which customer's requirements from a software system may be mapped to system capabilities, allowing an output of the framework to be provided to software developers with a high level solution, and allowing an output of software modules that can be used in order to meet the requirements, in one embodiment, the system capabilities may be mapped to a set of test cases, where the set of test cases may be utilized to validate that the output software meets the requirements, when the output solution is tested.

Figure 9:
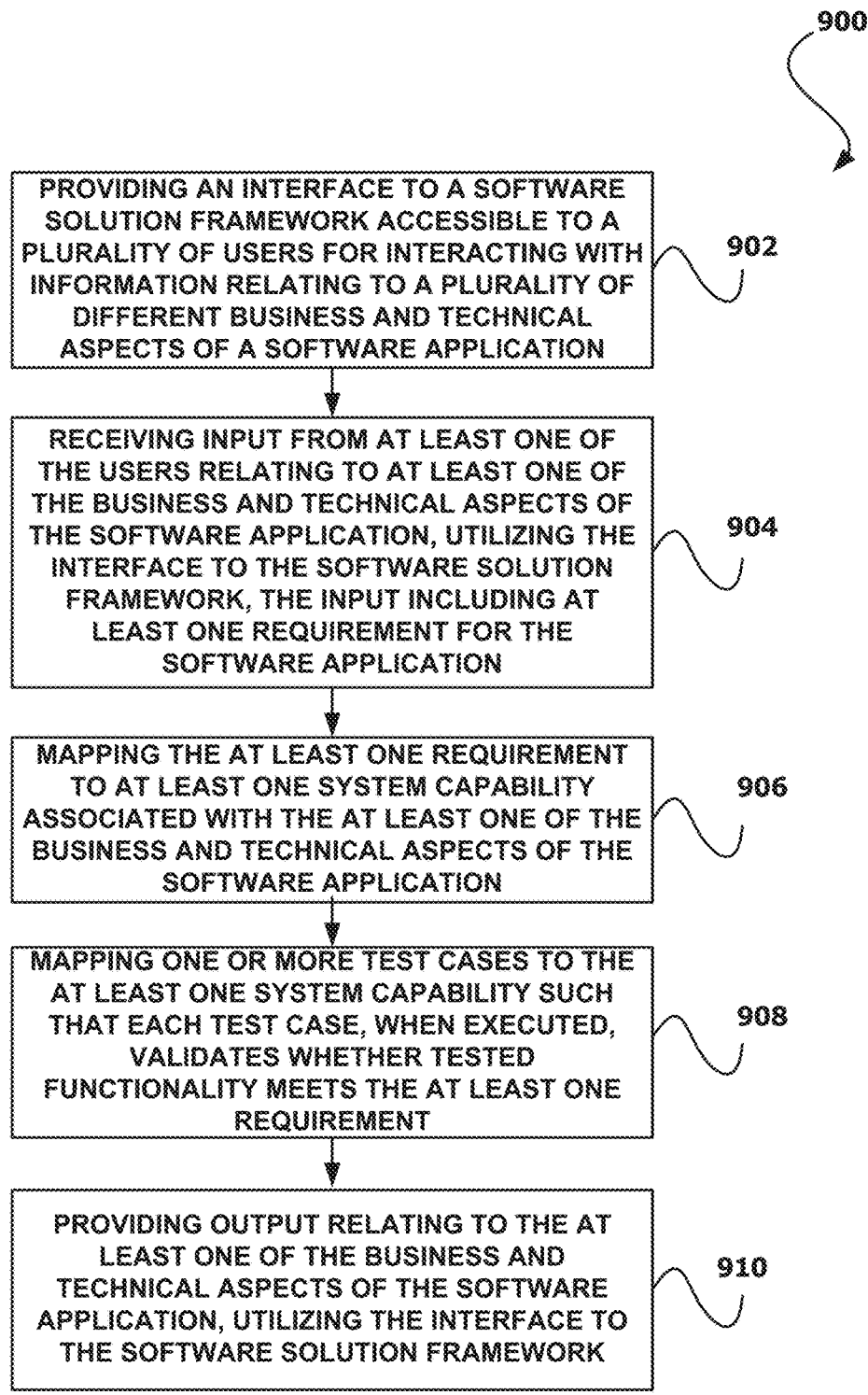
FIG. 9 shows a software solution framework method for allowing interaction with business and technical aspects of a software application, as well as for allowing testing associated with the software application, in accordance with one embodiment.

FIG. 9 shows a software solution framework method 900 for allowing interaction with business and technical aspects of a software application, as well as for allowing testing associated with the software application, in accordance with one embodiment. As an option, the method 900 may be carried out in the context of the details of the previous Figures. Of course, however, the method 900 may be carried out in any desired environment. Further, the aforementioned definitions may equally apply to the description below.

As shown, an interface is provided to a software solution framework accessible to a plurality of users for interacting with information relating to a plurality of different business and technical aspects of a software application. See operation 902.

Additionally, input is received from at least one of the users relating to at least one of the business and technical aspects of the software application, utilizing the interface to the software solution framework, the input including at least one requirement for the software application. See operation 904.

Further, the at least one requirement is mapped to at least one system capability associated with the at least one of the business and technical aspects of the software application. See operation 906.

In addition, one or more test cases are mapped to the at least one system capability such that each test case, when executed, validates whether tested functionality meets the at least one requirement. See operation 908.

Moreover, output is provided relating to the at least one of the business and technical aspects of the software application, utilizing the interface to the software solution framework. See operation 910.

In one embodiment, the software solution framework may include a repository of test cases including the one or more test cases. In this case, the software solution framework may be operable to select the one or more test cases from the repository of test cases that validates whether tested functionality meets the at least one requirement.

Additionally, in one embodiment, the software solution framework may be operable to select one or more software modules that meet the at least one requirement. When a software module is utilized to meet the at least one requirement without a change, test cases associated therewith may be used to validate the tested functionality without re-creation of a test design.

On the other hand, when a software module is modified as a result of the at least one requirement, the modification may be automatically identified and described by the software solution framework. In this case, the software solution framework may be operable to create a report of associated test cases that need to be added, deleted or modified according to the modification.

Further, in one embodiment, the software solution framework may be operable to generate a list of ready-made test cases. As an option, each of the ready-made test cases may be automatically classified as a test case that is able to be used as is, a test case that should be modified, or a new test case that is required when new functionality is to be developed.

In one embodiment, because a test case is associated with a system capability, the same test case may be used by testers more than once (e.g. everywhere in the business processes where the system capability is in use). When executing the test case to validate that the software meets at least one requirement, the tester may identify that the system is not operating as expected and the tester may open a defect. Using the link between the failed test case and the associated system capability, a report can be extracted, showing all other business flows that are consuming the malfunctioned software module and hence will fail as well.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 10:
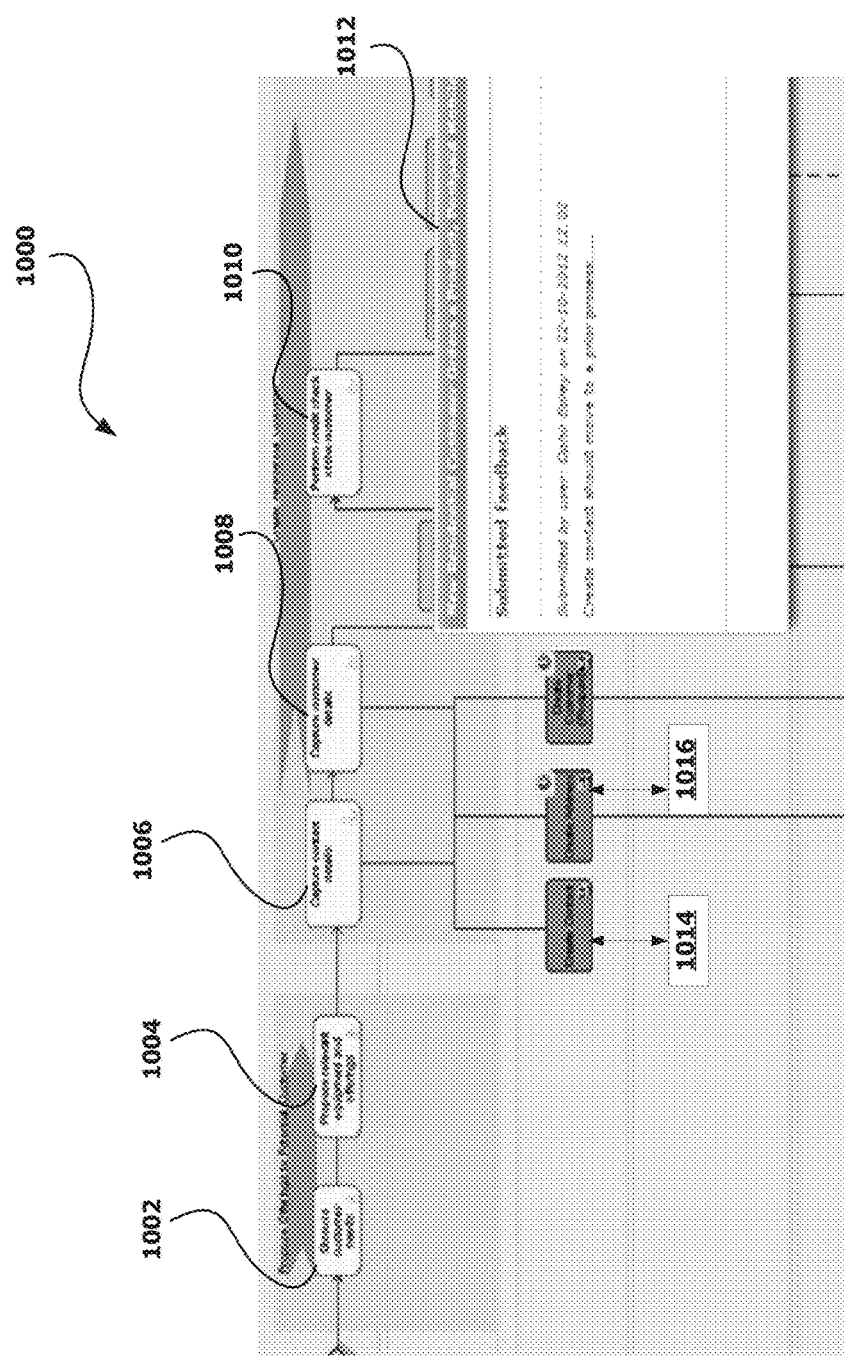
FIG. 10 shows an interface for receiving feedback on a business process of a software application, in accordance with one embodiment.

FIG. 10 shows an interface 1000 for receiving feedback on a business process of a software application, in accordance with one embodiment. As an option, the interface 1000 may be implemented in the context of the details of the previous Figures. Of course, however, the interface 1000 may be implemented in any desired environment. Further, the aforementioned definitions may equally apply to the description below.

In one embodiment, interface 1000 may be provided to a user for interaction with information relating to a plurality of different business and technical aspects of the software application. As illustrated in FIG. 10, interface 1000 is shown to present a business process containing business process steps 1002-1010. Further, the interface 1000 is shown to present feedback sub-interface 1012.

In one embodiment, the business process steps 1002-1010 may be steps within a software application. The business process steps 1002-1010 may be associated with creating a new end-user telecommunications customer. For example, business process step 1002 includes discussing customer needs, and business process step 1004 includes proposing relevant equipment and offerings. Further, business process step 1006 includes capturing contact details, business process step 1008 includes capturing customer details, and business process step 1010 includes performing a credit check of the customer.

Based on the presentation of the business process steps 1002-1010, input may be received from a user relating to business and technical aspects of the software application. For example, feedback may be received from the user pertaining to the business process steps 1002-1010 by way of the feedback sub-interface 1012. The user may be a salesperson, a customer, or a developer, or any other user of a software solution framework. By way of further example, the feedback received in the feedback sub-interface 1012 may be in regard to a connectivity of the business process steps 1002-1010, such as missing business process steps, or redundant business process steps. Still further, the feedback received in the feedback sub-interface 1012 may be in regard to any other business and technical aspect of the software application. The feedback received in the feedback sub-interface 1012 may include feedback received from a salesperson, and may be feedback associated with the software application.

In one embodiment, the sub-interface 1012 may indicate a submitting user, and a submitting date and time, for the received feedback. In another embodiment, the interface 1000 of the software solution framework may be used by a user for focusing on a particular business process, such as the business process containing the business process steps 1002-1010.

As shown further in FIG. 10, a test case 1014 and a test case 1016 are present. The test case 1014 describes how to validate that "Create Contact" is working as expected. The test case 1016 describes how to validate that "Create address" is working as expected.

In addition, since the referenced framework links the business steps 1002-1010 together and forms a business process 1000, associating the test cases 1014 and 1016 to business steps create a flow of end-to-end test scenario, which may be generated automatically.

In operation, each test case, when executed, may validate that the tested functionality meets the requirements. A test case is an activity that is performed by a tester, with various inputs, which validates that the behavior of the system meets the requirements.

In one embodiment, a repository of test cases may be added to the software solution framework. Test cases may be mapped to the system capabilities, which may already be mapped to the system behavior and the user requirements.

When the software solution framework is used to produce high-level solution to the developers, and is also used to select software modules that meet the customer requirements, the test cases that validate the proposed solution may be automatically selected from the repository, creating fast, accurate test design.

In one embodiment, when a software module is used to meet the requirements without a change, its attached test cases can be used to validate the solution without the need to re-create test design. Further, when a software module is modified, as a result of specific customer needs, the modification may be automatically identified and described by the software framework. In this case, a report may be created of associated test cases that need to be modified according to the modification.

Without these techniques, test cases would have to be created manually and would be based on the skills of a test designer. Utilizing these techniques, a list of ready-made test cases may be provided, and test cases may be automatically classified. In one embodiment, the test cases may be automatically classified as either: 1) test cases that may be used as is (e.g. when a module of software is embedded into the solution without a change, etc.); 2) test cases that should be modified (i.e. not re-written) because of the modification of the module; or 3) a new test case, for example, when the high-level solution (the output of the framework) requires new functionality to be developed.

Figure 11:
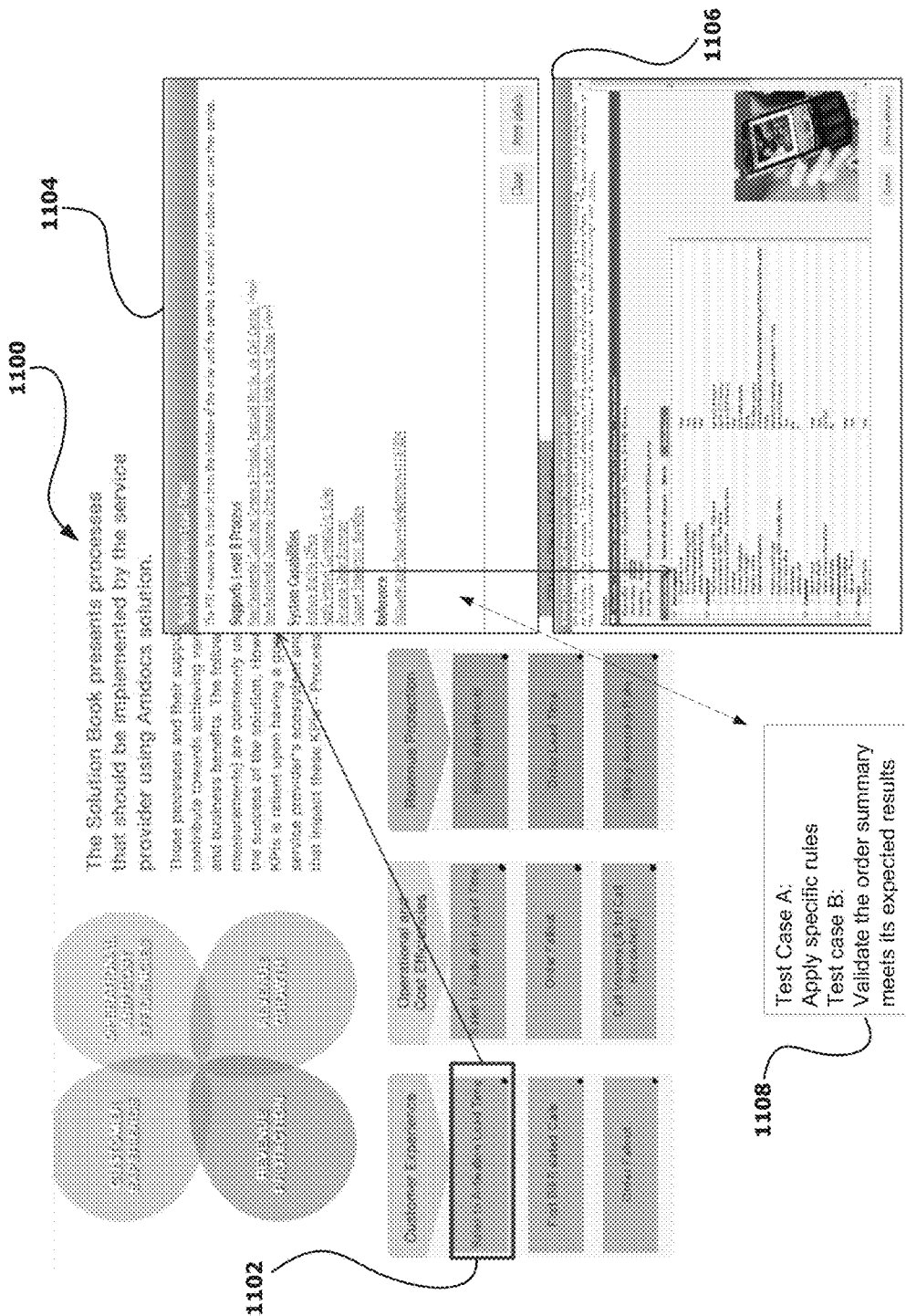
FIG. 11 shows an interface for linking customer targets and test cases into a software application, in accordance with one embodiment.

FIG. 11 shows an interface 1100 for linking customer targets and test cases into a software application, in accordance with one embodiment. As an option, the interface 1100 may be implemented in the context of the details of the previous Figures. Of course, however, the interface 1100 may be implemented in any desired environment. Further, the aforementioned definitions may equally apply to the description below.

In one embodiment, interface 1100 may be provided to a user for interaction with information relating to a plurality of different business and technical aspects of the software application. The interface 1100 may be operable to receive input from a user relating to business and technical aspects of a software application. In another embodiment, the interface 1100 may be operable to provide output relating to the business and technical aspects of the software application.

Input received using the interface 1100 may include a selection of a button by the user. The user may be a customer, a salesperson, or a developer. Further, the interface 1100 may include multiple buttons for selection, and some of the buttons may be operable to link customer targets into the software application. These buttons may be categorized into categories such as "Customer Experience," "Operational and Cost Efficiencies," "Revenue Protection," and "Revenue Growth."

In addition, the "Customer Experience" category may include buttons that are operable to open additional sub-interfaces upon selection. The additional sub-interfaces may be operable to receive further input from the user, or to provide further output, relating to the business and technical aspects of the software application. The buttons within the "Customer Experience" category may include a "Sales to Activation Lead Time" button 1102, a "First Bill Related Costs" button, an "Order Fallout" button, and an "Average Handling Time" button.

In response to receiving a selection of the "Sales to Activation Lead Time" button 1102, a sub-interface 1104 may open for receiving user input pertaining to sales and activation lead times. Sales and activation lead times may relate to the business and technical aspects of the software application. Further, in response to receiving a selection from a user of an option within the sub-interface 1104, a second sub-interface 1106 may open for receiving additional user input pertaining to the sales and activation lead times. Such additional user input may include input for linking customer targets into the software application. Input linking customer targets into the software application may relate to the business and technical aspects of the software application.

Also, the "Operational and Cost Efficiencies" category may include buttons that are operable to open additional sub-interfaces upon selection. The additional sub-interfaces may be operable to receive further input from the user, or to provide further output, relating to the business and technical aspects of the software application. The buttons within the "Operational and Cost Efficiencies" category may include a "Sales to Activation Lead Time" button, an "Order Fallout" button, a "Call Volume (& 1st Call Resolution)" button, and an "Order Lead Time" button.

Similarly, the "Revenue Protection" category may include buttons that are operable to open additional sub-interfaces upon selection. The additional sub-interfaces may be operable to receive further input from the user, or to provide further output, relating to the business and technical aspects of the software application. The buttons within the "Revenue Protection" category may include a "Billing Adjustments" button, an "Order Lead Time" button, and a "Billing Accuracy Rate" button.

In addition, the "Revenue Growth" category may include buttons that are operable to open additional sub-interfaces upon selection. The additional sub-interfaces may be operable to receive further input from the user, or to provide further output, relating to the business and technical aspects of the software application. The buttons within the "Revenue Growth" category may include a "Time to Market for New Offers/Products" button, and a "Time to Market for Offer Modification" button.

A selection by the user of the "Sales to Activation Lead Time" button 1102 may present the sub-interface 1104 for allowing the user to select amongst "System Capabilities" and "level B processes." System Capabilities may include "Analyze Eligible Offers," "Apply Product Compatibility Rules," "Generate Order Summary," "Support Interaction Workflows." Further, "level B processes" may include "New Residential Customer Orders a Product, Postpaid Mobile, via Shop," "Customer Has Upgrade Request for Mobile Device and/or Offer via Shop," and "New Residential Customer orders a Product, Postpaid Mobile, via Call Center." Also, offers available for selection may include "Wireless," "High-Speed Internet," "VoIP," "TV," "Wireless Basic," "Wireless Get Free Minutes," "Wireless Get Free Minutes Plan," "Wireless Get Free Minutes Plan for corporate," "Wireless Get Free SMS," and "Wireless Pre Paid." A selection by the user of any of the preceding "System Capabilities," "level B processes," or offers, may be input relating to the business and technical aspects of the software application.

The sub-interface 1104 may further be operable to display test case related information 1108, such that a user may select various options associated with test cases. For example, the test case related information 1108 may include options to apply specific Product Compatibility rules associated with a test case and/or validate aspects associated with the software.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for storing, by a system in a repository, a first set of pre-configured relationships between business aspects capable of being defined for a software application and technical aspects including pre-configured system capabilities capable of being incorporated into the software application for fulfilling related business aspects;

computer code for storing, by the system in the repository, a second set of pre-configured relationships between the technical aspects and test cases;

computer code for providing, by the system to a customer, an interface to a software solution framework;

computer code for receiving as input, by the system from the customer through the interface, a plurality of customer requirements relating to business aspects for the software application;

computer code for using the first set of pre-configured relationships in the repository to identify, by the system, the technical aspects that fulfill the plurality of received customer requirements by mapping in the repository the business aspects relating to the plurality of received customer requirements to the technical aspects related thereto;

computer code for using the second set of pre-configured relationships in the repository to identify, by the system, the test cases that validate whether tested functionality meets the plurality of received customer requirements by mapping in the repository the identified technical aspects to one or more of the test cases; and computer code for executing, by the system, the identified test cases to validate whether the tested functionality meets the plurality of received customer requirements;

wherein when a software module is utilized to meet the customer requirements without a change, test cases of the identified test cases that are associated therewith are used to validate the tested functionality without re-creation of a test design;

wherein the software solution framework is operable to create a report of added developed software modules, and only to the added developed software modules new test cases need to be created according to the development.

2. A method, comprising:

storing, by a system in a repository, a first set of pre-configured relationships between business aspects capable of being defined for a software application and technical aspects including pre-configured system capabilities capable of being incorporated into the software application for fulfilling related business aspects;

storing, by the system in the repository, a second set of pre-configured relationships between the technical aspects and test cases;

providing, by the system to a customer, an interface to a software solution framework;

receiving as input, by the system from the customer through the interface, a plurality of customer requirements relating to business aspects for the software application;

using the first set of pre-configured relationships in the repository to identify, by the system, the technical aspects that fulfill the plurality of received customer requirements by mapping in the repository the business aspects relating to the plurality of received customer requirements to the technical aspects related thereto mapping the at least one requirement to at least one system capability associated with the at least one of the business and technical aspects of the software application;

using the second set of pre-configured relationships in the repository to identify, by the system, the test cases that validate whether tested functionality meets the plurality of received customer requirements by mapping in the repository the identified technical aspects to one or more of the test cases; and executing, by the system, the identified test cases to validate whether the tested functionality meets the plurality of received customer requirements;

wherein when a software module is utilized to meet the customer requirements without a change, test cases of the identified test cases that are associated therewith are used to validate the tested functionality without re-creation of a test design;

wherein the software solution framework is operable to create a report of added developed software modules, and only to the added developed software modules new test cases need to be created according to the development.

3. A system, comprising:

a memory storing computer readable instructions; and a processor coupled to the memory for:

storing, in a repository in the memory, a first set of pre-configured relationships between business aspects capable of being defined for a software application and technical aspects including pre-configured system capabilities capable of being incorporated into the software application for fulfilling related business aspects;

storing, in the repository, a second set of pre-configured relationships between the technical aspects and test cases;

providing, to a customer, an interface to a software solution framework;

receiving as input, from the customer through the interface, a plurality of customer requirements relating to business aspects for the software application;

using the first set of pre-configured relationships in the repository to identify the technical aspects that fulfill the plurality of received customer requirements by mapping in the repository the business aspects relating to the plurality of received customer requirements to the technical aspects related thereto;

using the second set of pre-configured relationships in the repository to identify the test cases that validate whether tested functionality meets the plurality of received customer requirements by mapping in the repository the identified technical aspects to one or more of the test cases; and executing the identified test cases to validate whether the tested functionality meets the plurality of received customer requirements;

wherein when a software module is utilized to meet the customer requirements without a change, test cases of the identified test cases that are associated therewith are used to validate the tested functionality without re-creation of a test design:

wherein the software solution framework is operable to create a report of added developed software modules, and only to the added developed software modules new test cases need to be created according to the development.

* * * * *